United States Patent
Sato et al.

(10) Patent No.: US 7,198,258 B2
(45) Date of Patent: Apr. 3, 2007

(54) FLUID-FILLED CYLINDRICAL ELASTIC MOUNT

(75) Inventors: Yuji Sato, Komaki (JP); Akihiko Sakuragi, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 11/274,657

(22) Filed: Nov. 15, 2005

(65) Prior Publication Data

US 2006/0113717 A1     Jun. 1, 2006

(30) Foreign Application Priority Data

Nov. 29, 2004     (JP)     ............................. 2004-343555

(51) Int. Cl.
*F16M 5/00* (2006.01)
(52) U.S. Cl. ................................................. 267/140.13
(58) Field of Classification Search ...............................
267/140.11–141.7, 293, 294
See application file for complete search history.

(56) References Cited

U.S. PATENT DOCUMENTS

| | | | | |
|---|---|---|---|---|
| 4,702,346 | A * | 10/1987 | Uno et al. ................... | 181/207 |
| 4,936,557 | A * | 6/1990 | Schwerdt ................. | 267/141.2 |
| 5,356,121 | A * | 10/1994 | Ikeda ..................... | 267/140.12 |
| 5,413,319 | A * | 5/1995 | Hein et al. .............. | 267/140.12 |
| 5,690,320 | A * | 11/1997 | Kanda .................... | 267/140.12 |
| 6,364,298 | B1 * | 4/2002 | Vossel et al. ............... | 267/293 |
| 6,386,529 | B2 * | 5/2002 | Bik et al. ................... | 267/293 |
| 6,419,213 | B2 * | 7/2002 | Murai ................... | 267/140.12 |
| 2004/0004317 | A1 * | 1/2004 | Hatano et al. ......... | 267/140.12 |

FOREIGN PATENT DOCUMENTS

| | | |
|---|---|---|
| JP | 08-177954 A1 | 7/1996 |
| JP | 09-158973 A1 | 6/1997 |
| JP | 10-047420 A1 | 2/1998 |
| JP | 11-101295 A1 | 4/1999 |
| JP | 11-153180 A1 | 6/1999 |

* cited by examiner

Primary Examiner—Christopher P. Schwartz
(74) Attorney, Agent, or Firm—Burr & Brown

(57) ABSTRACT

A fluid-filled cylindrical elastic mount, including: a center shaft member; an intermediate sleeve; an elastic body; an outer cylindrical member having a thin sealing rubber layer on its inner circumferential surface and inserted on the sleeve; fluid chambers; and an outward flange provided at a first axial end of the mount. The outer cylindrical member has a concave portion, and the sleeve has a cylindrical portion at its one end located on the side of the first axial end and corresponding to the one end of the outer cylindrical member. An end face of the cylindrical portion of the sleeve is located nearer to a second axial end of the mount which is axially opposite to the first axial end, than a smallest-inside-diameter portion of the concave portion, whereby the end face of the cylindrical portion axially engages the engaging protruding portion of the sealing rubber layer.

5 Claims, 5 Drawing Sheets

FLUID-FILLED CYLINDRICAL ELASTIC MOUNT

This application is based on Japanese Patent Application No. 2004-343555 filed on Nov. 29, 2004, the contents of which are incorporated hereinto by reference.

BACKGROUND OF THE INVENTION

1. Field of the Invention

The present invention relates in general to a fluid-filled cylindrical elastic mount, and more particularly to such a fluid-filled cylindrical elastic mount which is capable of exhibiting damping effect with respect to input vibrations applied in its axial direction, based on flows of a fluid contained therein and which may be suitably used as a member mount for a suspension system of a motor vehicle, for example.

2. Discussion of Related Art

As one type of a mounting device interposed between two members in a vibration system to connect these two members in a vibration-damping fashion, there is known a so-called fluid-filled cylindrical elastic mount arranged to exhibit an excellent vibration damping characteristic on the basis of flows (such as resonance) of a fluid contained therein. Such a fluid-filled cylindrical elastic mount is disclosed in JP-A-11-153180, for instance.

Such a conventional fluid-filled cylindrical elastic mount includes, for instance: a center shaft member to be attached to one of the two members in the vibration system; an intermediate sleeve disposed radially outwardly of the center shaft member with a suitable distance therebetween; an elastic body disposed between the center shaft member and the intermediate sleeve for elastic connection therebetween; and an outer cylindrical member which is to be attached to the other of the two members and which is inserted on and fixed to an outer circumferential surface of the intermediate sleeve via a thin sealing rubber layer formed on an inner circumferential surface of the outer cylindrical member.

In the fluid-filled cylindrical elastic mount described above, the elastic body has pockets which are open in an outer circumferential surface thereof. With the outer cylindrical member inserted or fitted on the intermediate sleeve, the outer cylindrical member closes openings of these pockets, so that fluid chambers are formed between the outer cylindrical member and the center shaft member. Each fluid chamber is filled with a non-compressible fluid and is at least partially defined by the elastic body and the sealing rubber layer. Further, in the disclosed elastic mount, an outer flange is formed at one end of the intermediate sleeve located on the side of one of opposite axial ends of the elastic mount along a periphery of an opening of the intermediate sleeve at the above-indicated one end. The outward flange constitutes a stopper mechanism which limits an amount of relative axial displacement between (a) the intermediate sleeve and the outer cylindrical member inserted on the intermediate sleeve and (b) the center shaft member, with the outer cylindrical member and the center shaft member attached respectively to the two members in the vibration system. The thus constructed fluid-filled cylindrical elastic mount is used as a suspension member mount, a strut bar cushion, or a suspension upper support for a motor vehicle, for instance.

In the fluid-filled cylindrical elastic mount constructed as described above, there is formed, at the one end of the intermediate sleeve where the outward flange is formed, a concave portion that is concaved in a radially inward direction perpendicular to an axial direction of the elastic mount. Further, there is formed, at one end of the outer cylindrical member where an outward flange is formed, an engaging portion that is bent in the radially inward direction. The engaging portion of the outer cylindrical member is brought into engagement with the concave portion of the intermediate sleeve with the sealing rubber layer interposed therebetween, thereby assuring a sufficiently high degree of counter force with respect to extracting force that acts on the outer cylindrical member and the intermediate sleeve to cause the outer cylindrical member and the intermediate sleeve to be extracted from each other in the axial direction, that is, extraction-resisting force which resists the extraction of the outer cylindrical member and the intermediate sleeve relative from each other in the axial direction.

In the conventional cylindrical elastic mount described above, with the outer cylindrical member fitted on the intermediate sleeve, the outer cylindrical member is subjected to a diameter-reducing operation such as drawing using eight drawing dies, for instance, so that the outer cylindrical member is fixed to the intermediate sleeve. In this instance, the engaging portion is formed on the outer cylindrical member simply by performing the diameter-reducing operation such that the one end of the outer cylindrical member at which the outward flange is formed has a diameter reduced by an amount larger than an amount of reduction of a diameter of the rest of the outer cylindrical member. At the same time, the force acting on the outer cylindrical member to reduce its diameter (hereinafter, this force may be referred to as "the diameter-reducing force") acts also on the intermediate sleeve, so that the concave portion is formed, owing to the diameter-reducing force, at the above-indicated one end of the intermediate sleeve at which the outward flange is formed.

Accordingly, the conventional fluid-filled cylindrical elastic mount described above realizes, with excellent manufacturing efficiency and reduced manufacturing cost, a structure that sufficiently assures the extraction-resisting force that resists the extraction of the outer cylindrical member and the intermediate sleeve from each other in the axial direction, without requiring any special equipment or additional procedure.

The inventors of the present invention have made an extensive study on the fluid-filled cylindrical elastic mount constructed as described above for improving the manufacturing efficiency and attaining further reduction in the manufacturing cost of the elastic mount, and have found the following: In the conventional cylindrical elastic mount constructed as described above in which both of the intermediate sleeve and the outer cylindrical member are formed with the respective outward flanges, the formation of the outward flange on the intermediate sleeve and the formation of the outward flange on the outer cylindrical sleeve need to be performed separately in respective different steps, thereby giving an obstacle to the improvement in the manufacturing efficiency and the reduction in the manufacturing cost of the elastic mount.

Further, in the conventional fluid-filled cylindrical elastic mount, the sealing rubber layer is interposed between the concave portion of the intermediate sleeve and the engaging portion of the outer cylindrical member. Accordingly, when the concave portion and the engaging portion are formed on the intermediate sleeve and the outer cylindrical member, respectively, simultaneously upon performing the diameter-reducing operation on the outer cylindrical member fitted on the intermediate sleeve, a part of the sealing rubber member, which part is located between a portion of the outer cylindrical member at which the engaging portion is to be formed and a portion of the intermediate sleeve at which the concave portion is to be formed, is elastically deformed, thereby inevitably absorbing or decreasing the diameter-reducing force to be transmitted from the outer cylindrical member to the intermediate sleeve. Where the amount of absorption of decrease of the diameter-reducing force is excessively large, the configuration of the concave portion formed on the intermediate sleeve may largely differ from the configuration of the engaging portion formed on the outer cylindrical member, resulting in insufficient engagement of the engaging portion with respect to the concave portion. Consequently, there may be caused a risk of reduction in the extraction-resisting force which resists the extraction of the intermediate sleeve and the outer cylindrical member from each other in the axial direction.

To avoid the drawback described above, it may be considered to perform the diameter-reducing operation on the outer cylindrical member with larger diameter-reducing force. The increase in the diameter-reducing force to be applied to the outer cylindrical member, however, leads to an increase in a size of the equipment for performing the diameter-reducing operation, undesirably pushing up equipment cost.

It may be further considered that an intermediate sleeve having the concave portion which has been formed in advance is used and only the engaging portion is formed on the outer cylindrical member by the diameter-reducing operation. Where such an intermediate sleeve is used, however, there may be formed a minute clearance between an inner circumferential surface of the portion of the sealing rubber layer located radially inwardly of the engaging portion of the outer cylindrical member and an inner circumferential surface of the concave portion of the intermediate sleeve, due to deformation of the outer cylindrical member back toward a direction to increase its diameter that inevitably occurs after the outer cylindrical member has been freed from the diameter-reducing force. Such a minute clearance may deteriorate sealing between the outer cylindrical member and the intermediate sleeve.

SUMMARY OF THE INVENTION

The present invention has been made in the light of the situations described above. It is therefore an object of the invention to provide a fluid-filled cylindrical elastic mount having a novel structure which assures, with high stability, a sufficiently high degree of counter force (extraction-resisting force) with respect to extracting force that causes an intermediate sleeve and an outer cylindrical member inserted on the intermediate sleeve to be extracted from each other in the axial direction, while realizing excellent manufacturing efficiency and reduction of a cost of manufacture of the elastic mount.

To achieve the above-indicated object, in a first form of a fluid-filled cylindrical elastic mount according to the present invention, the elastic mount comprises: a center shaft member; an intermediate sleeve disposed radially outwardly of the center shaft member with a predetermined radial distance therebetween; an elastic body interposed between the center shaft member and the intermediate sleeve for elastic connection therebetween; an outer cylindrical member which has a thin sealing rubber layer provided on an inner circumferential surface thereof and which is inserted on the intermediate sleeve so as to be fixed to the intermediate sleeve via the sealing rubber layer; fluid chambers formed between the center shaft member and the outer cylindrical member and filled with a non-compressible fluid, each of the fluid chambers being at least partially defined by the elastic body and the sealing rubber layer; and an outward flange provided at a first axial end of the fluid-filled cylindrical elastic mount. In the fluid-filled cylindrical elastic mount, the outward flange is formed integrally with one end of the outer cylindrical member located on the side of the first axial end of the elastic mount along a periphery of an opening of the outer cylindrical member at said one end, the outer cylindrical member has a concave portion which is formed at a tubular wall portion thereof located on the side of the first axial end of the elastic mount and which is concaved in a radially inward direction that is perpendicular to an axial direction of the outer cylindrical member, and a part of the sealing rubber layer provided on the inner circumferential surface of the outer cylindrical member, which part is located radially inwardly of the concave portion, protrudes in the radially inward direction so as to provide an engaging protruding portion. Further, the intermediate sleeve has a cylindrical portion provided at one end thereof which is located on the side of the first axial end of the elastic mount and which corresponds to said one end of the outer cylindrical member located on the side of the first axial end of the elastic mount, and an end face of the cylindrical portion of the intermediate sleeve is located nearer to a second axial end of the elastic mount which is axially opposite to the first axial end, than a smallest-inside-diameter portion of the concave portion of the outer cylindrical member, whereby the end face of the cylindrical portion axially engages the engaging protruding portion of the sealing rubber layer.

In the fluid-filled cylindrical elastic mount constructed as described above, the outward flange constituting the above-described stop mechanism for limiting the relative axial displacement between (a) the intermediate sleeve and the outer cylindrical member inserted on the intermediate sleeve and (b) the center shaft member is formed at one end of the outer cylindrical member located on the side of the first axial end of the elastic mount along the periphery of the opening at said one end, and the cylindrical portion of the intermediate sleeve provided at one end thereof located on the side of the first axial end of the elastic mount has a simple cylindrical shape. Therefore, unlike the conventional fluid-filled cylindrical elastic mount in which outward flanges are respectively formed on one end of the outer sleeve and one end of the outer sleeve which correspond to the first axial end of the elastic mount, the present arrangement eliminates a need of processing the intermediate sleeve for forming the outward flange, thereby simplifying the manufacturing process and reducing the manufacturing cost.

In the first form described above, the end face of the cylindrical portion of the intermediate sleeve axially engages the engaging protrusion provided by a part of the sealing rubber layer located radially inwardly of the concave portion of the outer cylindrical member, thereby assuring a sufficiently high degree of counter force against extraction force which causes the intermediate sleeve and the outer sleeve to be extracted from each other in the axial direction, i.e., extraction-resisting force which resists the extraction of the intermediate sleeve and the outer sleeve relative from each other in the axial direction. Therefore, when the outer cylindrical member is fixed to the intermediate sleeve with the former inserted or mounted on the latter, by performing the diameter-reducing operation on the outer cylindrical member, for instance, the concave portion is formed on the tubular wall portion of the outer cylindrical member located on the side of the first axial end of the elastic mount, by applying thereto comparatively small diameter-reducing force, so that the diameter of the tubular wall portion is reduced by an amount larger than that by which the diameter of the rest of the outer cylindrical member is reduced. In this instance, the intermediate sleeve is not subjected to any processing operation. By thus forming the concave portion, the engaging protruding portion is provided by the part of the sealing rubber layer located radially inwardly of the concave portion, thereby realizing engagement of the engaging protruding portion and the end face of the intermediate sleeve.

The fluid-filled cylindrical elastic mount constructed according to the above-indicated first form, therefore, is free from the following problem experienced in the conventional fluid-filled cylindrical elastic mount in which the concave portion and the engaging portion are formed on mutually corresponding portions of the intermediate sleeve and the outer cylindrical member with the outer cylindrical member inserted on the intermediate sleeve and which is arranged to assure the extraction-resisting force that resists the extraction of the intermediate sleeve and the outer cylindrical member relative from each other in the axial direction owing to engagement of the concave portion and the engaging portion: The present elastic mount constructed according to the above-indicated first form is free from a risk of decrease in the extraction-resisting force which results from insufficient engagement between the concave portion and the engaging protruding portion due to difference or inconsistency in shape of those portions that arises from elastic deformation of the sealing rubber layer between the intermediate sleeve and the outer cylindrical member caused when the diameter-reducing operation is performed on the outer cylindrical member inserted on the intermediate sleeve.

Thus, the present fluid-filled cylindrical elastic mount according to the arrangement indicated above is free from the problems experienced in the conventional elastic mount. Accordingly, the present elastic mount assures with high stability a sufficiently high degree of the extraction-resisting force that resists the extraction of the intermediate sleeve and the outer cylindrical member inserted on the intermediate sleeve relative from each other in the axial direction while assuring excellent manufacturing efficiency and reduction of manufacturing cost.

In a second form of the fluid-filled cylindrical elastic mount according to the invention, the cylindrical portion of the intermediate sleeve has an outside diameter that is constant in an axial direction of the cylindrical portion.

In the above-indicated second form wherein the cylindrical portion of the intermediate sleeve has an outside diameter that is constant in its axial direction, a section of the engaging protruding portion of the sealing rubber layer, which section is positioned nearer to the second axial end of the elastic mount than an engaging section of the engaging protruding portion which engages the end face of the cylindrical portion of the intermediate sleeve, comes into contact with the smooth outer circumferential surface of the cylindrical portion. Accordingly, even if the concave portion of the outer cylindrical member may be deformed somewhat back toward the radially outward direction after the outer cylindrical member has been released from the diameter-reducing force acting thereon for forming the concave portion by the diameter-reducing operation, there is no risk that a clearance is formed between the inner circumferential surface of the engaging protruding portion of the sealing rubber layer and the outer circumferential surface of the cylindrical portion of the intermediate sleeve. Therefore, this arrangement is effective to prevent deterioration of the sealing between the outer cylindrical member and the intermediate sleeve due to the formation of the concave portion on the outer cylindrical member.

In a third form of the fluid-filled cylindrical elastic mount according to the invention, the smallest-inside-diameter portion of the concave portion of the outer cylindrical member has a radius ranging from a value that is smaller than a radius of an outer circumferential portion of the cylindrical portion of the intermediate sleeve by an amount corresponding to 35% of a thickness of the engaging protruding portion of the sealing rubber layer to a value that is larger than the radius of the outer circumferential portion of the cylindrical portion of the intermediate sleeve by an amount corresponding to 35% of the thickness.

According to the above-indicted third form, the engaging protruding portion of the sealing rubber layer engages the end face of the cylindrical portion of the intermediate sleeve with high reliability while advantageously preventing the outward flange formed in advance on the outer cylindrical member from being deformed due to the formation of the concave portion by the above-described diameter-reducing operation on the outer cylindrical member. As a result, this arrangement assures with higher stability sufficient extraction-resisting force.

In a fourth form of the fluid-filled cylindrical elastic mount according to the invention, the sealing rubber layer has at least one sealing protrusion (65) formed on an inner circumferential surface thereof at a position located nearer to the second axial end of the elastic mount than the engaging protruding portion of the sealing rubber layer, for assuring enhanced sealing between the outer cylindrical member and the intermediate sleeve to be exhibited by the sealing member.

According to the above-indicated fourth form, the sealing between the intermediate sleeve and the outer cylindrical member can be stably ensured without being substantially influenced by the formation of the concave portion on the outer cylindrical member by the diameter-reducing operation described above.

In a fifth form of the fluid-filled cylindrical elastic mount according to the invention, the outward flange formed integrally with the one end of the outer cylindrical member located on the side of the first axial end of the elastic mount along the periphery of the open end is provided, on a surface thereof located on the side of the first axial end of the elastic mount, with at least one stopper rubber block which projects from the surface in the axial direction of the outer cylindrical member.

According to the above-indicated fifth form, with the outer cylindrical member and the center shaft member mounted on respective two members in the vibration system, it is possible to limit relative axial displacement between (a) the intermediate sleeve and the outer cylindrical member inserted on and fixed to the intermediate sleeve and (b) the center shaft member, so as to mitigate shock or impact, thereby enabling the elastic mount to exhibit an excellent vibration damping characteristic.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENT

Figure 1:
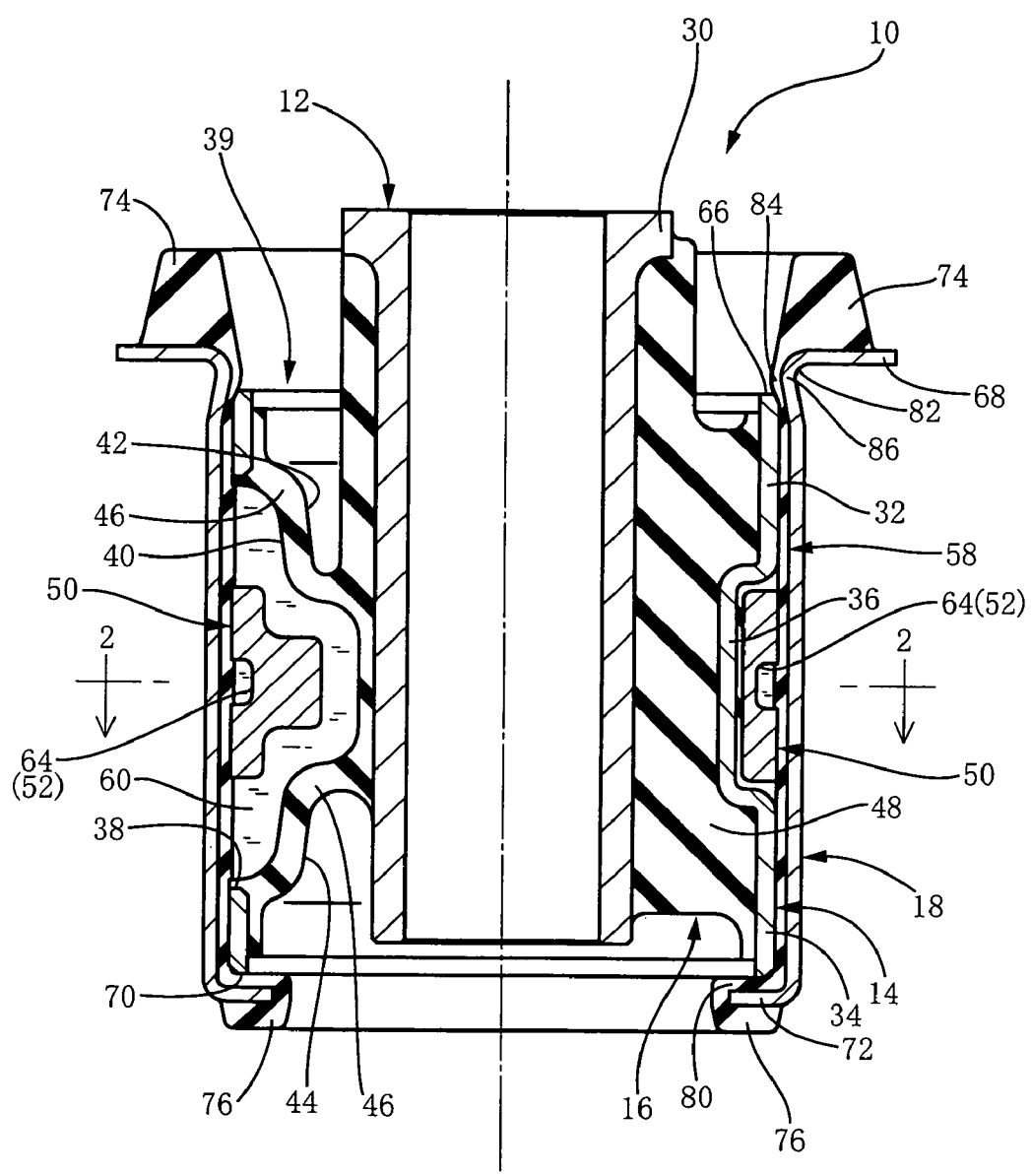
FIG. 1 is an elevational view in axial cross section taken along line 1—1 of FIG. 2, showing a fluid-filled cylindrical elastic mount according to one embodiment of the invention.

To further clarify the present invention, there will be described preferred embodiments of the invention by referring to the drawings.

Figure 2:
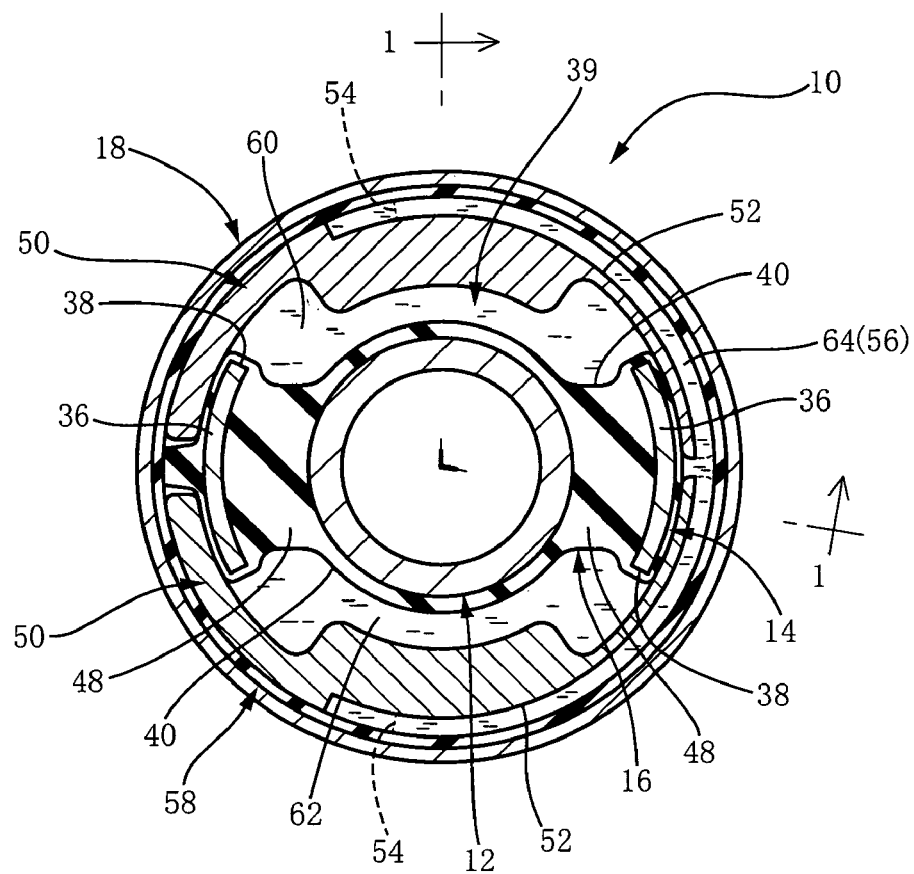
FIG. 2 is a cross sectional view taken along line 2—2 of FIG. 1.

Referring first to an axial cross sectional view of FIG. 1 and a transverse cross sectional view of FIG. 2, there is schematically shown a fluid-filled cylindrical elastic mount in the form of a suspension member mount for a motor vehicle, which is constructed according to one embodiment of the invention. The suspension member mount generally indicated at 10 in FIGS. 1 and 2 includes a center shaft member in the form of an inner sleeve 12 made of metal and an intermediate sleeve 14 which are spaced apart from each other with a suitable radial distance therebetween. The inner and intermediate sleeves 12, 14 are elastically connected to each other via an elastic body 16 interposed therebetween. On an outer circumferential surface of the intermediate sleeve 14, there is fitted or inserted an outer cylindrical member in the form of an outer sleeve 18 made of metal, so that the outer sleeve 18 is fixed to the intermediate sleeve 14.

Figure 3:
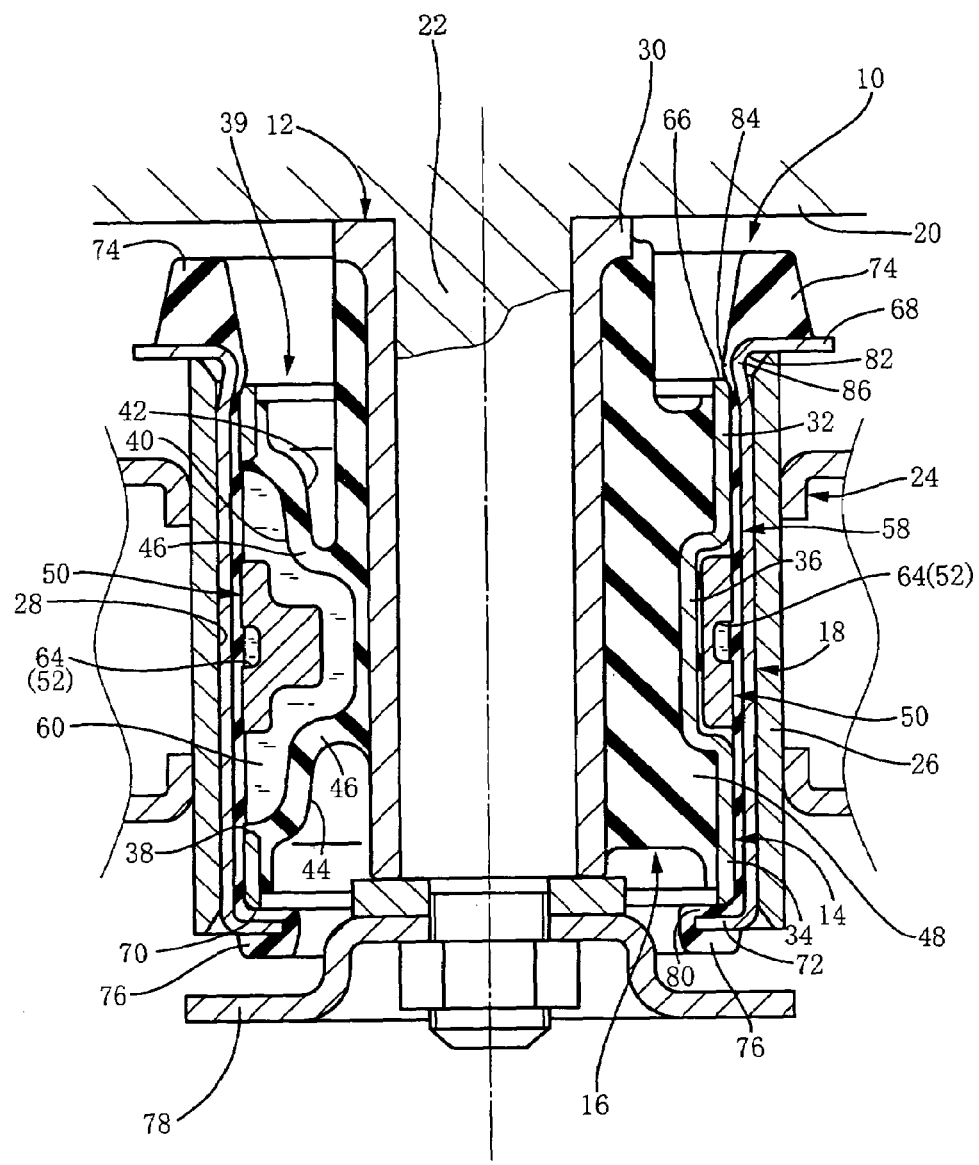
FIG. 3 is an elevational view in axial cross section corresponding to FIG. 1, showing the fluid-filled cylindrical elastic mount in a state in which the elastic mount is mounted on a vehicle body.

As shown in FIG. 3, the member mount 10 is installed on the vehicle such that the inner sleeve 12 is fixed, by a bolt, to a rod 22 extending from a body 20 of the vehicle while the outer sleeve 18 is fixedly press-fitted in a mounting hole 28 of a fixing sleeve 26 provided on a suspension member 24, whereby the member mount 10 is interposed between the suspension member 24 and the body 20 of the vehicle. The member mount 10 is oriented on the vehicle such that a vertical direction as seen in FIG. 1 corresponds to a vertical direction of the vehicle while a vertical direction as seen in FIG. 2 corresponds to a longitudinal or running direction (a back and forth direction) of the vehicle and a right and left direction as seen in FIG. 2 corresponds to a lateral or widthwise direction (a right and left direction) of the vehicle. In the following explanation, the vertical direction basically corresponds to the vertical direction as seen in FIG. 1. Further, terms such as "the axial direction", "the circumferential direction", "the radially inward direction" and "the radially outward direction" used herein are defined in relation to the member mount 10 unless otherwise specified.

Described more specifically, as shown in FIGS. 1 and 2, the inner sleeve 12 has a cylindrical shape and includes, at its axially upper end, an integrally formed annular outward flange 30 that protrudes in the radially outward direction. Radially outwardly of the inner sleeve 12, the intermediate sleeve 14 formed of metal is disposed coaxially with the inner sleeve 12, such that the sleeves 12, 14 are spaced apart from each other with a suitable radial distance therebetween.

The intermediate sleeve 14 is generally a thin, cylindrical member with a relatively large diameter. The intermediate sleeve 14 has a circumferential groove extending continuously in its circumferential direction and formed at its axially middle portion, thereby providing a small-diameter portion 36. Owing to the circumferential groove formed as described above, there are provided an upper large-diameter portion 32 on one of axially opposite sides of the small-diameter portion 36 and a lower large-diameter portion 34 on the other of the axially opposite sides of the same 36. Each of the upper and lower large-diameter portions 32, 34 has an outside diameter that is constant in the axial direction thereof. At diametrically opposite two portions of the intermediate sleeve 14 which are opposed to each other in the longitudinal or running direction of the vehicle (i.e., the vertical direction as seen in FIG. 2), there are formed a pair of windows 38, 38 each as a cutout formed by cutting an axially lower part of the upper large-diameter portion 32, an entirety of the small-diameter portion 36, and an axially upper part of the lower large-diameter portion 34. Each of the windows 38 has a circumferential length that is slightly smaller than a half of an entire circumference of the large-diameter portions 32, 34.

Between the thus formed intermediate sleeve 14 and the inner sleeve 12 which are radially spaced apart from each other, the elastic body 16 having a substantially cylindrical shape with a relatively large wall thickness is interposed, so that the inner sleeve 12 and the intermediate sleeve 14 are elastically connected to each other. The elastic body 16 is formed by vulcanization of a rubber material for the elastic body 16 within a mold in which the inner sleeve 12 and the intermediate sleeve 14 are disposed relative to each other as described above. Namely, there is formed an intermediate vulcanized product 39 in which the elastic body 16 is bonded by vulcanization at its inner and outer circumferential surfaces to the inner sleeve 12 and the intermediate sleeve 14, respectively.

At diametrically opposite two portions of the elastic body 16 (hereinafter may be referred to as "the first circumferential portions of the elastic body 16) which are opposed to each other in the longitudinal or running direction of the vehicle (i.e., the vertical direction as seen in FIG. 2), there are formed a pair of pockets 40, 40 each in the form of a recess. Each pocket 40 is located at axially middle of the elastic body 16 and has a circumferential length that is smaller by a predetermined amount than a half of the circumference of the elastic body 16. The pockets 40, 40 of the elastic body 16 are open in the outer circumferential surface of the intermediate sleeve 14 through the corresponding windows 38, 38 of the same 14. At the first circumferential potions of the elastic body 16 corresponding to the respective pockets, 40, 40, there are formed: a pair of upper hollow sections 42, 42 so as to be open in an upper end face of the elastic body 16 and have a suitable depth, i.e., extend axially inwards from the upper end face over a suitable axial length; and a pair of lower hollow sections 44, 44 so as to be open in a lower end face of the elastic body 16 and have a suitable depth, i.e., extend axially inwards from the lower end face over a suitable axial length.

Accordingly, at the first circumferential portions of the elastic body 16 corresponding to the pockets 40, 40, partition-wall portions between the upper and lower hollow sections 42, 44 and the corresponding pockets 40, 40 are made as respective thin-walled portions 46. Further, second circumferential portions of the elastic body 16 not corresponding to the pockets 40 and sandwiched between the first circumferential portions as viewed in the circumferential direction (i.e., perpendicular to the first circumferential portions) are made as respective thick-walled portions 48. In other words, the thin-walled portions 46 are opposed to each other in a first diametric direction corresponding to the longitudinal or running direction of the vehicle while the thick-walled portions 48 are opposed to each other in a second diametric direction which is perpendicular to the first diametric direction and which corresponds to the lateral or transverse direction (the widthwise direction) of the vehicle.

Thus, the elastic body 16 is arranged to exhibit a stiff or hard spring characteristic in the second diametric direction corresponding to the lateral or transverse direction of the vehicle for ensuring excellent steering stability of the vehicle, and a soft spring characteristic in the first diametric direction corresponding to the longitudinal or running direction of the vehicle for ensuring improved damping effect with respect to harshness, etc, thereby assuring enhanced ride comfort as felt by vehicle passengers.

To the intermediate vulcanized product 39 in which the elastic body 16 is bonded at its inner and outer circumferential surfaces to the inner sleeve 12 and the intermediate sleeve 14, respectively, there are attached a pair of orifice-defining members 50, 50 which are identical in shape. Each of the orifice-defining members 50 is a generally semiannular member and has a first groove 52 which is formed in its outer circumferential surface at its axially or widthwise middle portion so as to be open in end face of one circumferential end of the orifice-defining member 50 and which extends continuously in a circumferential direction of the same 50 with a circumferential length that is slightly larger than a half of that of the orifice-defining member 50. At a substantially circumferentially middle portion of the outer circumferential surface of each orifice-defining member 50, there is formed a second groove 54 which is open in an end face of one axial end of the orifice-defining member 50 and which continuously and axially extends from that axial end toward an axially middle portion for communicating with the first groove 52 at the axially middle portion.

With the thus constructed orifice-defining members 50, 50 positioned such that the end faces of the respective circumferential ends of these members 50, 50 in which the respective first grooves 52, 52 are open are opposed to each other and such that the end faces of the respective axial ends of these members 50, 50 in which the respective second grooves 54, 54 are open face downward, the orifice-defining members 50, 50 are attached to the small-diameter portion 36 of the intermediate sleeve 14 so as to be partially located within the respective windows 38, 38.

Thus, the first grooves 52 of the respective orifice-defining members 50, 50 are connected to each other in the circumferential direction, to thereby form a circumferential groove 56 which extends in the circumferential direction of the intermediate sleeve 14 with a circumferential length which is slightly larger than a half of that of the intermediate sleeve 14 and which communicates at its circumferentially opposite ends with the respective pockets 40, 40 formed in the elastic body 16 via the respective second grooves 54, 54. In the present embodiment, a portion of the elastic body 16 is formed to surround the inner and outer circumferential surfaces of the small-diameter portion 36 of the intermediate sleeve 14, whereby the portion of the elastic body 16 is interposed between the orifice-defining members 50 and the small-diameter portion 36, assuring effective sealing therebetween.

On the outer circumferential surface of the intermediate vulcanized product 39 to which the orifice-defining members 50 are thus attached, the outer sleeve 18 having a thin sealing rubber layer 58 that is formed on an entire inner circumferential surface thereof is fixedly inserted or mounted.

Upon inserting of the outer sleeve 18 on the intermediate vulcanized product 39, the openings of the respective pockets 40, 40 and the circumferential groove 56 that is defined by the orifice-defining members 50, 50 are fluid-tightly closed, thereby providing a first and a second fluid chamber 60, 62 which are filled with a predetermined non-compressible fluid and an orifice passage 64 which permits fluid communication between these two fluid chambers 60, 62.

Figure 5:
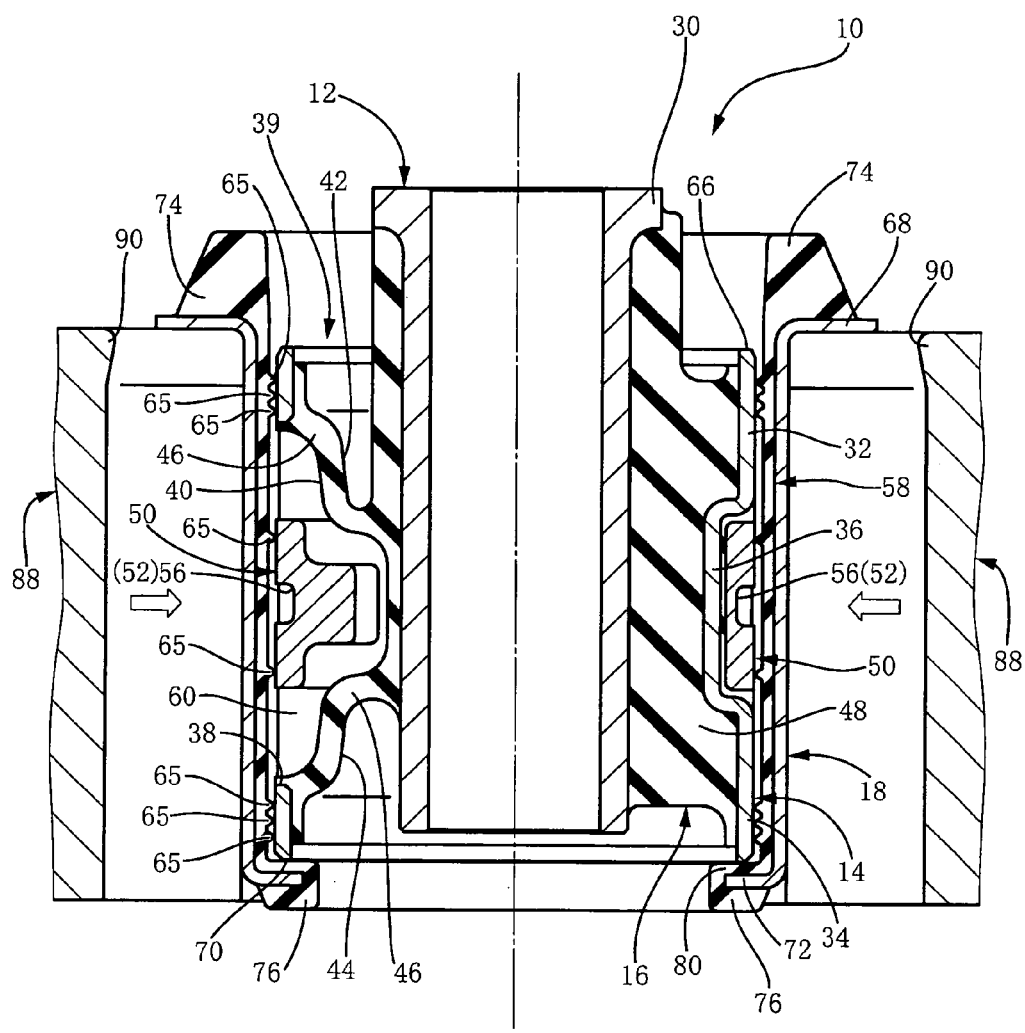
FIG. 5 is a view for explaining a process of producing the fluid-filled cylindrical elastic mount of FIG. 1.

As shown in FIG. 5, a plurality of sealing protrusions 65 each continuously extending in the circumferential direction of the outer sleeve 18 are formed integrally on an inner circumferential surface of the sealing rubber layer 58 provided on the inner circumferential surface of the outer sleeve 18, at three axial parts of the sealing rubber layer 58, namely, at an upper axial part that is to be brought into contact with a corresponding upper part of the outer circumferential surface of the upper large-diameter portion 32 of the intermediate sleeve 14, at a lower axial part that is to be brought into contact with a corresponding lower part of the outer circumferential surface of the lower large-diameter portion 34 of the same 14, and at an intermediate axial part that is to be brought into contact with the outer circumferential surfaces of the orifice-defining members 50. These sealing protrusions 65 are formed integrally with the sealing rubber layer 58 and are suitably spaced apart from each other in the axial direction. The thus formed sealing protrusions 65 assure sufficiently enhanced sealing between the outer sleeve 18 and the intermediate sleeve 14. Examples of the non-compressible fluid, with which the fluid chambers 60, 62 are filled, include water, alkylene glycol, polyalkylene glycol and silicone oil. For permitting the member mount 10 to exhibit a high degree of damping effect based on resonance of the non-compressible fluid, it is preferable to employ a viscous fluid whose viscosity is 0.1 Pa·s or lower. The filling of the fluid chambers 60, 62 with the selected fluid may be advantageously conducted by fitting the outer sleeve 18 on the intermediate vulcanized product 39 within a mass of the selected fluid, for instance.

Upon application of a vibrational load between the inner sleeve 12 and the outer sleeve 18 of the thus constructed member mount 10 in its axial direction, the fluid pressures in the first and second fluid chambers 60, 62 are changed relative to each other due to elastic deformation of the thin-walled portions 46 of the elastic body 16, whereby the non-compressible fluid is forced to flow between the first and second fluid chambers 60, 62 through the orifice passage 64. As a result, the member mount 10 exhibits damping effect with respect to the input vibration based on the resonance of the fluid. Therefore, the present member mount 10 assures excellent ride comfort by the damping effect based on the resonance of the fluid and the damping effect exhibited by the member mount 10 owing to the soft spring characteristic in the longitudinal or running direction of the vehicle and the stiff spring characteristic in the lateral or widthwise direction of the vehicle described above. It is noted that the damping effect based on the resonance of the fluid can be suitably tuned by adjusting the length, the cross sectional area, etc., of the orifice passage 64.

In the present embodiment, the axial length (the height) of the outer sleeve 18 is made sufficiently larger than that of the intermediate sleeve 14. An outward flange 68 is formed integrally with an axially upper end of the outer sleeve 18 located on the side of an upper axial end of the member mount 10, along a periphery of an upper opening of the outer sleeve 18. With the outer sleeve 18 fixedly fitted on the intermediate sleeve 14, the axially upper end of the outer sleeve 18 is located axially upwardly of an upper end face 66 of the upper large-diameter portion 32 of the intermediate sleeve 14 as seen in FIG. 1. The outward flange 68 protrudes in the radially outward direction perpendicular to the axial direction with a suitable distance and extends continuously in the circumferential direction of the outer sleeve 18. Further, an inward flange 72 is formed integrally with an axially lower end of the outer sleeve 18 located on the side of a lower axial end of the member mount 10, along a periphery of a lower opening of the outer sleeve 18. The axially lower end of the outer sleeve 18 is located axially downwardly of a lower end face 70 of the lower large-diameter portion 34 of the intermediate sleeve 14 as seen in FIG. 1. The inward flange 72 protrudes in the radially inward direction perpendicular to the axial direction with a suitable distance and extends continuously in the circumferential direction of the outer sleeve 18.

Described more specifically, the outer sleeve 18 includes, at its axially upper end portion, an extended tubular wall portion that extends so as to be located axially upwardly of the upper end face 66 of the intermediate sleeve 14 and the outward flange 68 formed at an upper end of the tubular wall portion. Further, the outer sleeve 18 includes, at its axially lower end portion, an extended tubular portion that extends so as to be located axially downwardly of the lower end face 70 of the lower large-diameter portion 34 of the intermediate sleeve 14.

As shown in FIG. 1, on an upper surface of the outward flange 68 of the outer sleeve 18, there are provided a plurality of stopper rubber blocks 74 each in the form of a projection that projects from the upper surface in the axially upward direction with a suitable height. The stopper rubber blocks 74 are formed integrally with the sealing rubber layer 58. On a lower surface of the inward flange 72, there are provided a plurality of buffer rubber blocks 76 each in the form of a projection that projects from the lower surface in the axially downward direction with a suitable height. The buffer rubber blocks 76 are formed integrally with the sealing rubber layer 58. The stopper rubber blocks 74 and the buffer rubber blocks 76 are respectively spaced apart from each other in the circumferential direction of the outer sleeve 18.

Upon application of a large vibrational load in the axial direction to the member mount 10 mounted on the vehicle as shown in FIG. 3, each stopper rubber block 74 is brought into abutting contact with the body 20 of the vehicle and each buffer rubber block 76 is brought into abutting contact with a stopper metal member 78 that is fixed by bolt to the rod 22 provided on the body 20 of the vehicle, thereby limiting an amount of axial displacement of the outer sleeve 18 relative to the inner sleeve 12. Namely, each of a combination of the outward flange 68 and the stopper rubber blocks 74 and a combination of the inward flange 72 and the buffer rubber blocks 76 constitutes a stop mechanism for limiting the amount of axial displacement of the inner and outer sleeves 12, 18 relative to each other.

Further, on an upper surface of the inward flange 72, there is formed a connecting rubber portion 80 having a wall thickness corresponding to that of the extended tubular wall portion of the axially lower end portion of the outer sleeve 18 and connecting the buffer rubber blocks 76 provided on the lower surface of the inward flange 72 and the sealing rubber layer 58 fixed to the inner circumferential surface of the outer sleeve 18 integrally to each other. According to this arrangement, the lower end face 70 of the intermediate sleeve 14 is opposed to the upper surface of the inner flange 72 with the connecting rubber portion 80 interposed therebetween. As a result, when there is applied, between the intermediate sleeve 14 and the outer sleeve 18, extracting force that causes the outer sleeve 18 to be extracted in the axially upward direction or extracting force that causes the intermediate sleeve 14 to be extracted in the axially downward direction, the extraction of the outer sleeve 18 in the axially upward direction or the extraction of the intermediate sleeve 14 in the axially downward direction can be prevented owing to engaging action of the connecting rubber portion 80 and the inward flange 72 with respect to the lower end face 70 of the intermediate sleeve 14.

Figure 4:
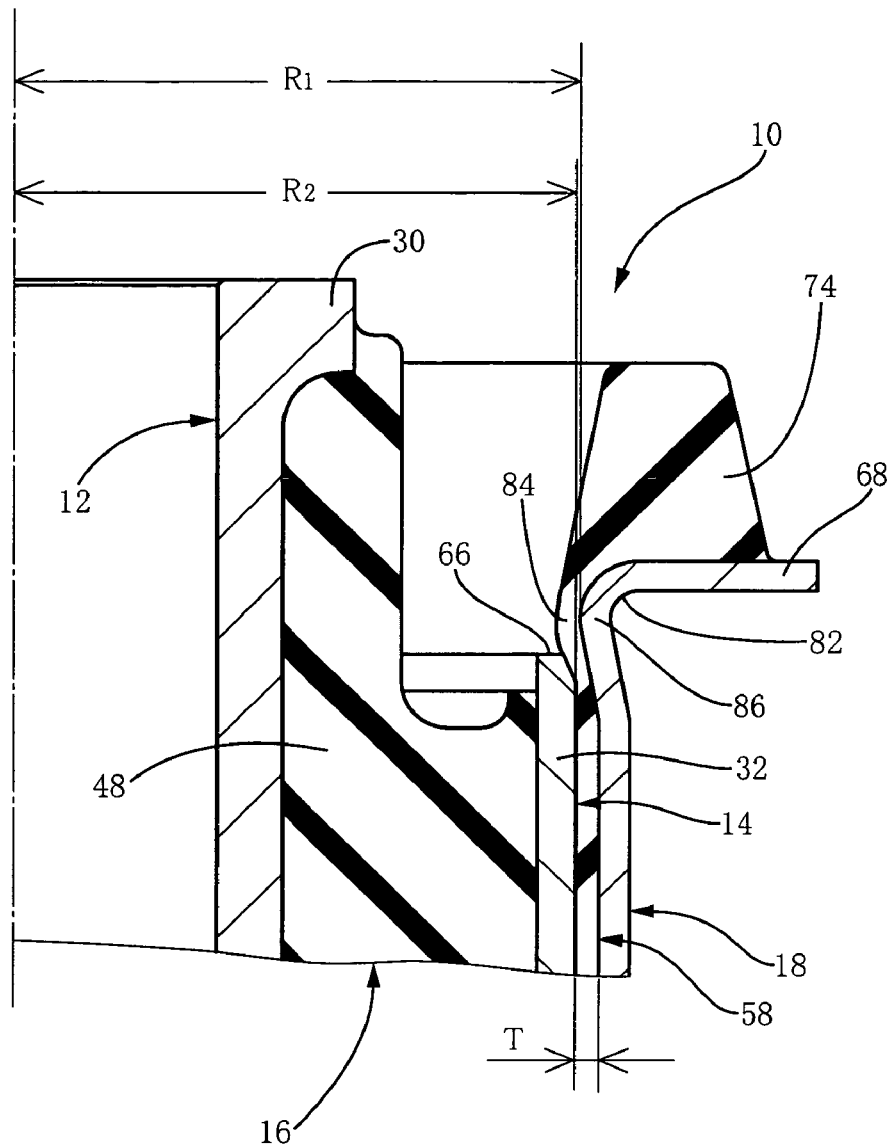
FIG. 4 is a partly enlarged view of FIG. 1.

As shown in FIGS. 1 and 4, in the present member mount 10, there is formed, at the extended tubular wall portion of the axially upper end portion of the outer sleeve 18, a concave portion 82 which is concaved in the radially inward direction and which continuously extends in the circumferential direction. Further, a part of the sealing rubber layer 58 located radially inwardly of the extended tubular wall portion of the outer sleeve 18 where the concave portion 82 is formed is bent and protrudes in the radially inward direction following the concavity of the concave portion 82, so as to provide an engaging protruding portion 84. Moreover, a deepest portion of the concave portion 82 of the outer sleeve 18, namely, a smallest-inside-diameter portion 86 of the concave portion 82 where an inside diameter of the concave portion 82 is the smallest, is located axially upwardly of the upper end face 66 of the intermediate sleeve 14 by a suitable distance. Accordingly, the engaging protruding portion 84 located radially inwardly of the concave portion 82 axially engages, at its protruding end, the upper end face 66 of the intermediate sleeve 14.

In the thus constructed member mount 10, when there is applied, between the intermediate sleeve 14 and the outer sleeve 18, extracting force that causes the outer sleeve 18 to be extracted in the axially downward direction or extracting force that causes the intermediate sleeve 14 to be extracted in the axially upward direction, the engaging protruding portion 84 of the sealing rubber layer 58 receives compressive force, whereby engaging force or friction force with respect to the upper end face 66 of the intermediate sleeve 14 is generated at the engaging protruding portion 84. On the basis of the engaging force or the friction force, effective counter force with respect to the extracting force, namely, effective extraction-resisting force which resists the extraction of the outer sleeve 18 and the intermediate sleeve 14 relative from each other in the axial direction, can be exhibited between those sleeves 14, 18 to a sufficient extent. In the present member mount 10, an outer circumferential edge of the upper large-diameter portion 32 of the intermediate sleeve 14 is chamfered as shown in FIG. 4, thereby preventing the engaging protruding portion 84 from being damaged due to contact thereof with the outer circumferential edge.

In the present embodiment, a radius $R_1$ of the smallest-inside-diameter portion 86 of the concave portion 82 that forms the protruding end of the engaging protruding portion 84 of the sealing rubber layer 58 is not particularly limited, as long as the engaging protruding portion 84 is arranged to engage, at its protruding end, the upper end face 66 of the intermediate sleeve 14. It is, however, preferable that the above-described radius $R_1$ be held in a range of a value, i.e., $R_2 - 0.35 \cdot T$, that is smaller than a radius $R_2$ of an outer circumferential portion of the upper large-diameter portion 32 of the intermediate sleeve 14 by an amount corresponding to 35% of a thickness T of the sealing rubber layer 58 to a value, i.e., $R_2 + 0.35 \cdot T$, that is larger than the above-indicated radius $R_2$ by an amount corresponding to 35% of the thickness T of the sealing rubber layer 58.

The radius $R_1$ of the smallest-inside-diameter portion 86 of the concave portion 82 is preferably held in the above-described range, i.e., $R_2-0.35\cdot T \leq R_1 \leq R_2+0.35\cdot T$, for the following reasons: If the above-indicated radius $R_1$ of the smallest-inside-diameter portion 86 of the concave portion 82 exceeds the upper limit of the above-indicated range (namely, if the radius $R_1$ is larger than the maximum value of the range), an amount or degree of concaveness of the concave portion 82 is not enough, so that an amount of protrusion of the engaging protruding portion 84 at its protruding end is too small and accordingly an engaging amount of the engaging protruding portion 84 that engages the upper end face 66 of the intermediate sleeve 14 is considerably largely decreased. This may cause a risk of insufficient extraction-resisting force to be exhibited based on the engaging force or friction force with respect to the upper end face 66 generated at the engaging protruding portion 84. On the other hand, if the above-indicated radius $R_1$ of the smallest-inside-diameter portion 86 of the concave portion 82 is below the lower limit of the above-indicated range (namely, if the radius $R_1$ is smaller than the minimum value of the range), the amount or degree of concaveness of the concave portion 82 becomes excessively large, whereby the outward flange 68 formed at the axially upper end of the outer sleeve 18 may be undesirably deformed upon formation of the concave portion 82. In this instance, the outward flange 68 cannot maintain its form protruding in the radially outward direction perpendicular to the axial direction and extending in the circumferential direction. Consequently, the action of the outward flange 68 for limiting the axial displacement of the outer sleeve 18 and the inner sleeve 12 relative to each other may be deteriorated.

Therefore, for the purpose of obtaining a sufficiently high degree of the extraction-resisting force which resists the extraction of the outer sleeve 18 and the intermediate sleeve 14 relative from each other in the axial direction while advantageously limiting excessive axial displacement of the inner sleeve 12 and the outer sleeve 18 relative to each other, the above-indicated radius $R_1$ of the smallest-inside-diameter portion 86 of the concave portion 82 is preferably held in the above-indicated range. More preferably, the radius $R_1$ of the smallest-inside-diameter portion 86 of the concave portion 82 is made substantially equal to the radius $R_2$ of the outer circumferential portion of the upper large-diameter portion 32 of the intermediate sleeve 14.

The suspension member mount 10 having the construction described above is produced according to a following method, for instance.

Initially, the intermediate vulcanized product 39 is formed in which the elastic body 16 is bonded by vulcanization at its inner and outer circumferential surfaces to the inner sleeve 12 and the intermediate sleeve 14, respectively. In the meantime, the sealing rubber layer 58 is formed on the inner circumferential surface of the outer sleeve 18 in which the outward flange 68 and the inward flange 72 are formed in advance. Further, the stopper rubber blocks 74 and the buffer rubber blocks 76 are formed on the outward flange 68 and the inward flange 72, respectively.

Next, as shown in FIG. 5, after the pair of orifice-defining members 50, 50 have been attached to the intermediate sleeve 14 of the intermediate vulcanized product 39, the outer sleeve 18 is inserted on the intermediate vulcanized product 39 such that the axially upper open end of the outer sleeve 18 is initially inserted on a lower end portion of the intermediate vulcanized product 39. In this instance, the connecting rubber portion 80 of the sealing rubber layer 58 is brought into contact with the lower end face 70 of the intermediate sleeve 14, so that the lower end face 70 and the inward flange 72 of the outer sleeve 18 are opposed to each other with the connecting rubber portion 80 interposed therebetween. Further, the sealing protrusions 65 formed at the upper axial part of the inner circumferential surface of the sealing rubber layer 58 are disposed so as to be opposed to the corresponding upper part of the outer circumferential surface of the upper large-diameter portion 32 of the intermediate sleeve 14 while the sealing protrusions 65 formed at the lower axial part of the inner circumferential surface of the sealing rubber layer 58 are disposed so as to be opposed to the corresponding lower part of the outer circumferential surface of the lower large-diameter portion 34 of the intermediate sleeve 14.

Thereafter, the outer sleeve 18 is subjected to a diameter-reducing operation. The diameter-reducing operation is advantageously performed according to eight-die-using drawing or sixteen-die-using drawing in which is used a suitable drawing jig 88, as shown in FIG. 5, for instance, by applying compressive force that acts on the outer sleeve 18 in a direction from its outer circumferential surface toward the radially inward direction. Owing to the diameter-reducing operation, the diameter of the outer sleeve 18 is reduced, whereby the pair of orifice-defining members 50, 50 are fluid-tightly fixed to the intermediate sleeve 14 while the intermediate sleeve 14 is fluid-tightly fixed to the outer sleeve 18. Accordingly, the intermediate vulcanized product 39 and the outer sleeve 18 are securely fixed to each other while at the same time the first and second fluid chambers 60, 62 are formed, whereby the intended suspension member mount 10 is produced.

As shown in FIG. 5, the drawing jig 88 has, at its upper axial end, a drawing protuberance 90 which protrudes in a radially inward direction of the jig 88 and which extends continuously in the circumferential direction of the jig 88. The drawing jig 88 is configured to provide a drawing rate in a diametric direction that is larger at the upper axial end where the drawing protuberance 90 is formed, than at an axially middle thereof. In the present embodiment, the drawing protuberance 90 is configured to have an inclined surface that protrudes in the radially inward direction such that an amount of protrusion in the radially inward direction gradually increases in a direction toward the axially upper end of the jig 88, so that the amount of protrusion is maximal at the axially upper end. The protuberance 90 has at its protruding end a smoothly curved cross sectional shape.

The drawing operation on the outer sleeve 18 is performed using the drawing jig 88 having the protuberance 90 constructed as described above, thereby reduce the diameter of the outer sleeve 18 at its axially upper end portion which is located radially outwardly of a part of the sealing rubber layer 58, which part is located above the upper axial part thereof on which the sealing protrusions 65 are formed, by an amount considerably larger than that by which the diameter of the rest of the outer sleeve 18 is reduced. Consequently, the diameter of the extended tubular wall portion of the outer sleeve 18 which extends so as to be located above the upper end face 66 of the intermediate sleeve 14 is reduced, whereby the concave portion 82 which is concaved in the radially inward direction is formed at the extended tubular wall portion of the outer sleeve 18 so as to extend continuously in the circumferential direction. At the same time when the concave portion 82 is formed, a part of the sealing rubber layer located radially inwardly of the concave portion 82 protrudes in the radially inward direction, thereby forming the engaging protruding portion 84 that extends continuously in the circumferential direction.

In the present arrangement described above, the concave portion 82 of the outer sleeve 18 and the engaging protruding portion 84 of the sealing rubber layer 58 which assure excellent extraction-resisting force that resists the extraction of the outer sleeve 18 and intermediate sleeves 14 relative from each other in the axial direction can be formed simultaneously using the specific drawing jig 88 in the drawing operation of the outer sleeve 18 conventionally performed for fixing or fitting the outer sleeve 18 to or on the intermediate sleeve 14. Accordingly, the present arrangement does not require any special procedure or operation for forming the concave portion 82 and the engaging protrusion 84, assuring excellent manufacturing efficiency of the member mount 10.

Further, in the present embodiment, only the extended tubular wall portion of the axially upper end portion of the outer sleeve 18 is concaved in the drawing operation of the outer sleeve 18 for fitting the same 18 on the intermediate sleeve 14, and the axially upper end portion of the intermediate sleeve 14 is not subjected to any working operation, namely, is not processed at all. Accordingly, unlike a case in which the axially upper end portions of the outer sleeve 18 and the intermediate sleeve 14 are simultaneously subjected to the drawing operation so as to form, at the respective axially upper end portions, concave portions which are to be engaged with each other for exhibiting the extraction-resisting force, the present arrangement is effective to minimize required processing force and free from a decrease in the extraction-resisting force which may arise from difference or inconsistency in shape of the concave portions respectively formed on the outer sleeve and the intermediate sleeve.

In the present embodiment, the outward flange 68 which cooperates with the stopper rubber blocks 74 provided on its upper surface to exhibit action of limiting the axial displacement of the outer sleeve 18 and the inner sleeve 12 relative to each other is formed at the axially upper open end of the outer sleeve 18, and the axially upper end portion of the intermediate sleeve 14 is made as the upper large-diameter portion 32 having a simple cylindrical shape whose inside and outside diameters are respectively constant in the axial direction. Therefore, the present arrangement advantageously achieves improved efficiency and reduced cost in manufacture of the intermediate sleeve 14, as compared with a case in which an outward flange is also formed on the axially upper end portion of the intermediate sleeve 14.

Accordingly, the member mount 10 constructed according to the present embodiment assures with high stability a sufficiently high degree of extraction-resisting force that resists the extraction of the intermediate sleeve 14 and the outer sleeve 18 relative from each other in the axial direction while realizing improved efficiency and reduced cost in its manufacture. As a result, the present member mount 10 can exhibit excellent load-resisting capability in the axial direction and excellent operating reliability and durability.

Moreover, in the present member mount 10 constructed as described above, the axially upper end portion of the intermediate sleeve 14 is not located or present at all radially inwardly of the concave portion 82 of the outer sleeve 18. Therefore, even if the concave portion 82 of the outer sleeve 18 may be deformed somewhat back toward the radially outward direction after completion of the above-described drawing operation of the outer sleeve 18, it is avoidable that the sealing between the outer sleeve 18 and the intermediate sleeve 14 is deteriorated due to such deformation. In addition, since the concave portion 82 of the outer sleeve 18 is located above the axially upper part of the sealing rubber layer 58 at which the sealing protrusions 65 are formed for enhancing the sealing between the outer and intermediate sleeves 18, 14, the sealing action exhibited by the sealing protrusions 65 is not adversely influenced by the drawing operation performed for forming the concave portion 82 on the outer sleeve 18.

Accordingly, the thus constructed member mount 10 assures excellent sealing property with high stability, thereby stably and reliably exhibiting excellent damping effect based on flows of the fluid between the first and second fluid chambers 60, 62.

While the preferred embodiment of the present invention has been described in detail, for illustrative purpose only, it is to be understood that the present invention is not limited to the details of the illustrated embodiment.

For instance, the configuration of the concave portion 82 formed at the axially upper end portion of the outer sleeve 18 is not limited to that of the illustrated embodiment. Further, the configuration of the engaging protruding portion 84 formed radially inwardly of the concave portion 82 may be suitably changed depending upon the configuration of the concave portion 82.

The concave portion 82 and the engaging protruding portion 84 may be formed according to a method other than that described above. For instance, the axially upper end portion of the outer sleeve 18 may be subjected to deformation processing using a rolling body such as a roller, for forming the concave portion 82 and the engaging protruding portion 84.

The specific structure such as the location, the number, the form of each of the fluid chambers 60, 62 and the orifice passage 64 is not limited to that of the illustrated embodiment, but may be suitably determined depending upon the required damping characteristic.

As the attaching structure by which the inner sleeve 12 as the center shaft member and the outer sleeve 18 as the outer cylindrical member are attached to the members in the vibration damping system, any known structure may be suitably employed.

In the illustrated embodiment, the center shaft member is a hollow cylindrical member. The center shaft member may be a solid member.

While the suspension member mount 10 for a motor vehicle has been described as the preferred embodiment of the invention, the principle of the invention is equally applicable to various types of fluid-filled cylindrical vibration damping device such as a differential mount, a body mount, a sub-frame mount, a cab mount or a strut bar cushion used on motor vehicles and for various other applications.

It is to be understood that the present invention may be embodied with various other changes and modifications which may occur to those skilled in the art, without departing from the spirit and scope of the invention defined in the attached claims.

What is claimed is:

1. A fluid-filled cylindrical elastic mount, comprising:
   a center shaft member;
   an intermediate sleeve disposed radially outwardly of said center shaft member with a predetermined radial distance therebetween;
   an elastic body interposed between said center shaft member and said intermediate sleeve for elastic connection therebetween;

an outer cylindrical member which has a thin sealing rubber layer provided on an inner circumferential surface thereof and which is inserted on said intermediate sleeve so as to be fixed to said intermediate sleeve via said sealing rubber layer;

fluid chambers formed between said center shaft member and said outer cylindrical member and filled with a non-compressible fluid, each of said fluid chambers being at least partially defined by said elastic body and said sealing rubber layer; and an outward flange provided at a first axial end of the fluid-filled cylindrical elastic mount, wherein said outward flange is formed integrally with one end of said outer cylindrical member located on the side of said first axial end of the elastic mount along a periphery of an opening of said outer cylindrical member at said one end, said outer cylindrical member has a concave portion which is formed at a tubular wall portion thereof located on the side of said first axial end of the elastic mount and which is concaved in a radially inward direction that is perpendicular to an axial direction of said outer cylindrical member, and a part of said sealing rubber layer provided on said inner circumferential surface of said outer cylindrical member, which part is located radially inwardly of said concave portion, protrudes in said radially inward direction so as to provide an engaging protruding portion;

wherein said intermediate sleeve has a cylindrical portion provided at one end thereof which is located on the side of said first axial end of the elastic mount and which corresponds to said one end of said outer cylindrical member located on the side of said first axial end of the elastic mount, said cylindrical portion of said intermediate sleeve has an outside diameter that is constant in an axial direction of said cylindrical portion;

wherein an end face of said cylindrical portion of said intermediate sleeve is located nearer to a second axial end of the elastic mount which is axially opposite to said first axial end, than a smallest-inside-diameter portion of said concave portion of said outer cylindrical member, whereby said end face of said cylindrical portion axially engages said engaging protruding portion of said sealing rubber layer; and wherein said smallest-inside-diameter portion of said concave portion of said outer cylindrical member has a radius ranging from value that is smaller than a radius of an outer circumferential portion of said cylindrical portion of said intermediate sleeve by an amount corresponding to 35% of a thickness of said engaging protruding portion of said sealing rubber layer to a value that is larger than said radius of said outer circumferential portion of said cylindrical portion of said intermediate sleeve by an amount corresponding to 35% of the thickness.

2. A fluid-filled cylindrical elastic mount according to claim 1, wherein said outward flange formed integrally with said one end of said outer cylindrical member located on the side of said first axial end of the elastic mount along said periphery of said open end is provided, on a surface thereof located on the side of said first axial end of the elastic mount, at least one stopper rubber block which projects from said surface in the axial direction of said outer cylindrical member.

3. A fluid-filled cylindrical elastic mount according to claim 2, wherein said at least one stopper rubber block is formed integrally with said sealing rubber layer.

4. A fluid-filled cylindrical elastic mount according to claim 1, wherein said radius of said smallest-inside-diameter portion of said concave portion of said outer cylindrical member is substantially equal to said radius of said outer circumferential portion of said cylindrical portion of said intermediate sleeve.

5. A fluid-filled cylindrical elastic mount according to claim 1, wherein said sealing rubber layer has at least one sealing protrusion formed on an inner circumferential surface thereof at a position located nearer to said second axial end of the elastic mount than said engaging protruding portion of said sealing rubber layer, for assuring enhanced sealing between said outer cylindrical member and said intermediate sleeve to be exhibited by said sealing member.

* * * * *